US005915237A

United States Patent [19]

Boss et al.

[11] Patent Number: 5,915,237

[45] Date of Patent: Jun. 22, 1999

[54] REPRESENTING SPEECH USING MIDI

[75] Inventors: Dale Boss, Portland; Sridhar Iyengar; T. Don Dennis, both of Beaverton, all of Oreg.

[73] Assignee: Intel Corporation, Santa Clara, Calif.

[21] Appl. No.: 08/764,933

[22] Filed: Dec. 13, 1996

[51] Int. Cl.[6] .................... G09B 5/00

[52] U.S. Cl. .................... 704/258; 704/260; 704/272; 704/501

[58] Field of Search .................... 704/258, 260, 704/4, 5, 272, 501

[56] References Cited

U.S. PATENT DOCUMENTS

| | | | |
|---|---|---|---|
| 3,982,070 | 9/1976 | Flanagan | 179/1 |
| 4,797,930 | 1/1989 | Goudie | 704/258 |
| 4,817,161 | 3/1989 | Kaneko | 381/51 |
| 5,327,498 | 7/1994 | Hamon | 381/51 |
| 5,384,893 | 1/1995 | Hutchins | 704/267 |
| 5,521,324 | 5/1996 | Dannenberg | 84/612 |
| 5,524,172 | 6/1996 | Hamon | 704/268 |
| 5,615,300 | 3/1997 | Hara | 704/260 |
| 5,621,182 | 4/1997 | Matsumoto | 84/610 |
| 5,652,828 | 7/1997 | Silverman | 704/260 |
| 5,659,350 | 8/1997 | Hendrics et al. | 348/6 |
| 5,680,512 | 10/1997 | Rabowsky | 704/501 |

OTHER PUBLICATIONS

Steve Smith, "Dual Joy Stick Speaking Word Processor and Musical Instrument," Proceedings: John Hopkins National Search for Computing Applications to Assist Persons with Disabilities, Feb. 1–5, 1992, p. 177.

B. Abner & T. Cleaver, "Speech Synthesis Using Frequency Modulation Techniques," Proceedings: IEEE Southeastcon '87, Apr. 5–8, 1987, vol. 1 of 2, pp. 282–285.

Alex Waibel, "Prosodic Knowledge Sources for Word Hypothesization in a Continuous Speech Recognition System," IEEE, 1987, pp. 534–537.

Alex Waibel, "Research Notes in Artificial Intelligence, Prosody and Speech Recognition," 1988, pp. 1–213.

Victor W. Zue, "The Use of Speech Knowledge in Automatic Speech Recognition," IEEE, 1985, pp. 200–213.

*Primary Examiner*—David R. Hudspeth
*Assistant Examiner*—Daniel Abebe
*Attorney, Agent, or Firm*—Kenyon & Kenyon

[57] ABSTRACT

A speech encoding system for encoding a digitized speech signal into a standard digital format, such as MIDI. The MIDI speech encoding system includes a memory storing a dictionary comprising a digitized pattern and a corresponding segment ID for each of a plurality of speech segments (i.e., phonemes). A speech analyzer identifies each of the segments in the digitized speech signal based on the dictionary. One or more prosodic parameter detectors measure values of the prosodic parameters of each received digitized speech segment. A MIDI speech encoder converts the segment IDs and the corresponding measured prosodic parameter values into a MIDI speech signal. A MIDI speech decoding system includes a MIDI data decoder and a speech synthesizer for converting the MIDI speech signal to a digitized speech signal.

30 Claims, 4 Drawing Sheets

REPRESENTING SPEECH USING MIDI

CROSS REFERENCE TO RELATED APPLICATIONS

The subject matter of the present application is related to the subject matter of U.S. patent application attorney docket number 08/764,961, entitled "Retaining Prosody During Speech Analysis For Later Playback," to Dale Boss, Sridhar lyengar and T. Don Dennis and assigned to Intel Corporation, filed on even date herewith, and U.S. patent application attorney docket number 08/764,962, entitled "Audio Fonts Used For Capture and Rendering," to Timothy Towell and assigned to Intel Corporation, filed on even date herewith.

BACKGROUND

The present invention relates to speech systems and more particularly to a speech system that encodes a speech signal to a MIDI compatible format.

Speech analysis systems include automatic speech recognition systems and speech synthesis systems. Automatic speech recognition systems, also known as speech-to-text systems, include a computer (hardware and software) that analyzes a speech signal and produces a textual representation of the speech signal. Speech synthesis systems use a language model, which is a set of principles describing language use, to construct a textual representation of the analog speech signal. In other words, the speech recognition system uses a combination of pattern recognition and sophisticated guessing based on some linguistic and contextual knowledge. However, due to a limited vocabulary and other system limitations, a speech recognition system can guess incorrectly. For example, a speech recognition system receiving a speech signal having an unfamiliar accent or unfamiliar words may incorrectly guess several words, resulting in a textual output which can be unintelligible.

One proposed speech recognition system is disclosed in Alex Waibel, "Prosody and Speech Recognition, Research Notes In Artificial Intelligence," Morgan Kaufman Publishers, 1988 (ISBN 0-934613-70-2). Waibel discloses a speech-to-text system (such as an automatic dictation machine) that extracts prosodic information or parameters from the speech signal to improve the accuracy of text generation. Prosodic parameters associated with each speech segment may include, for example, the pitch (fundamental frequency $F_O$) of the segment, duration of the segment, and amplitude (or stress or volume) of the segment. Waibel's speech recognition system is limited to the generation of an accurate textual representation of the speech signal. After generating the textual representation of the speech signal, any prosodic information that was extracted from the speech signal is discarded. Therefore, a person or system receiving the textual representation output by a speech-to-text system will know what was said, but will not know how it was said (i.e., pitch, duration, rhythm, intonation, stress).

Similarly, speech synthesis systems exist for converting text to synthesized speech. However, because no information is typically provided with the text as to how the speech should be generated (i.e., pitch, duration, rhythm, intonation, stress), the result is typically an unnatural or mechanized sounding speech. As a result, automatic speech recognition (speech-to-text) systems and speech synthesis (text-to-speech) systems may not be effectively used for the encoding, storing and transmission of natural sounding speech signals.

Speech, music and other sounds are commonly digitized using an analog-to-digital (A/D) converter and compressed for transmission or storage. Even though digitized sound can provide excellent speech rendering, this technique requires a very high bit rate (bandwidth) for transmission and a very large storage capacity for storing the digitized speech information, and provides no flexibility or editing capabilities.

A variety of MIDI devices exist, such as MIDI editors and sequencers for storing and editing a plurality of MIDI tracks for musical composition, and MIDI synthesizers for generating music based on a received MIDI signal. MIDI is an acronym for Musical Instrument Digital Interface. The interface provides a set of control commands that can be transmitted and received for the remote control of musical instruments or MIDI synthesizers. The MIDI commands from one MIDI device to another indicate actions to be taken by the controlled device, such as identifying a musical instrument (i.e., piano, clarinet) for music generation, turning on a note or altering a parameter in order to generate or control sound. In this way, MIDI commands control the generation of sound by remote instruments, but the MIDI control commands do not carry sound or digitized information. A MIDI sequencer is capable of storing, editing and manipulating several tracks of MIDI musical information. A MIDI (musical) synthesizer may be connected to the sequencer and generates musical sounds based on the MIDI commands received from the sequencer. Therefore, MIDI provides standard set of commands for representing music efficiently and includes several powerful editing and sound generation devices.

There exist speech synthesis systems that have used MIDI as the interface between a computer and a music synthesizer in attempt to generate speech. For example, Bernard S. Abner, Thomas G. Cleaver, "Speech Synthesis Using Frequency Modulation Techniques," Conference Proceedings, IEEE Southeastcon '87, pp. 282–285, Apr. 5–8, 1987, discloses an IBM-PC connected to a music synthesizer via a MIDI interface. The music synthesizer, under control of the PC, uses Frequency Modulation (FM) to synthesize various sounds or phonemes in attempt to generate synthesized speech. The FM synthesis system disclosed by Abner and Cleaver, however, provides no technique for allowing a user to modify the various prosodic parameters of each phoneme, or to convert from digitized speech to MIDI. In addition, the use of a music synthesizer for speech synthesis is problematic because a music synthesizer is designed to generate music, not speech, and results in the generation of mechanical and unnatural sounding speech. In connecting the various phonemes together to form speech, the music synthesizer treats the speech segments or phonemes as a clarinet, a piano or other designated musical instrument, rather than human speech. Therefore, the FM synthesis system of Abner and Cleaver is inflexible and impractical and cannot be used for the generation and manipulation of natural sounding speech.

Therefore, a need exists for a speech system that provides a compact representation of a speech signal in a standard digital format, such as MIDI, for efficient transmission, storage, manipulation, editing, etc., and which permits accurate and natural sounding reconstruction of the speech signal.

SUMMARY OF THE INVENTION

The speech system of the present invention overcomes the disadvantages and drawbacks of prior art systems.

A speech encoding system according to an embodiment of the present invention is provided for encoding a digitized speech signal into a standard digital format, such as MIDI. The speech encoding system includes a memory storing a dictionary comprising a digitized pattern and a corresponding segment ID for each of a plurality of speech segments (i.e., phonemes). The speech encoding system includes an A/D converter for digitizing the analog speech signal. A speech analyzer is coupled to the memory and the A/D converter and identifies each of the speech segments in the digitized speech signal based on the dictionary. The speech analyzer also outputs the speech segments and segment IDs for each identified speech segment. One or more prosodic parameter detectors are coupled to the memory and the speech analyzer and measure values of the prosodic parameters of each received digitized speech segment. A speech encoder converts the segment IDs and the corresponding measured prosodic parameter values for each of the identified speech segments into a speech signal having a standard digital format, such as MIDI.

A speech decoding system according to an embodiment of the present invention decodes a speech signal provided in a standard digital format, such as MIDI, into an analog speech signal. The speech decoding system includes a dictionary, which stores a digitized pattern for each of a plurality of speech segments and a corresponding segment ID identifying each of the digitized segment patterns. A data decoder converts the received speech signal that is provided in the standard digital format to a plurality of speech segment IDs and corresponding prosodic parameter values. A plurality of speech segment patterns are selected from the dictionary corresponding to the speech segment IDs in the converted received speech signal. A speech synthesizer modifies the selected speech segment patterns according to the values of the corresponding prosodic parameters in the converted received speech signal. The modified speech segments are output to create a digitized speech signal, which is converted to analog format by a D/A converter.

DETAILED DESCRIPTION

Figure 1:
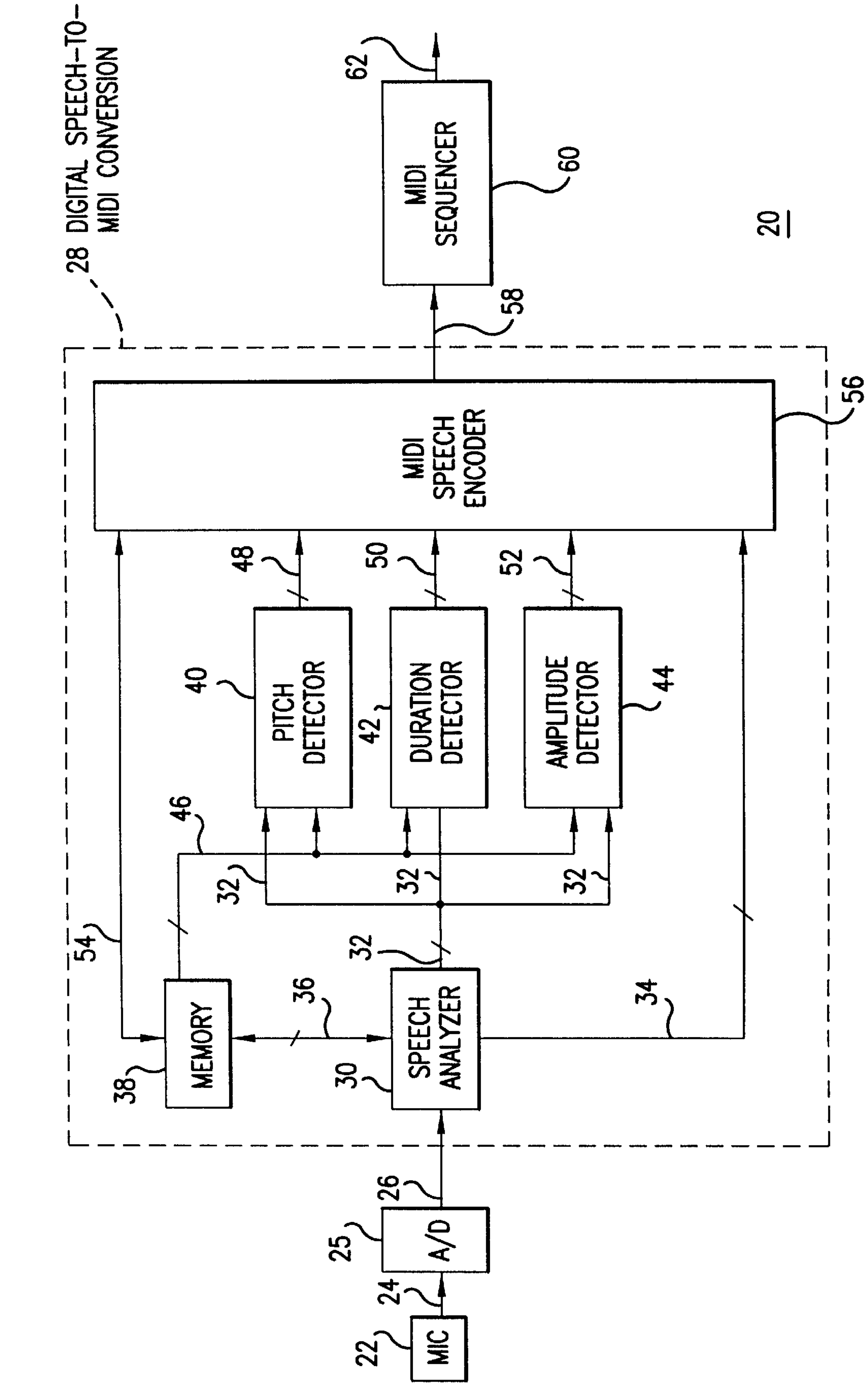
FIG. 1 illustrates a functional block diagram of a MIDI speech encoding system according to a first embodiment of the invention.

Referring to the drawings in detail, wherein like numerals indicate like elements, FIG. 1 illustrates a functional block diagram of a MIDI speech encoding system according to a first embodiment of the invention. While the embodiments of the present invention are illustrated with reference to the MIDI format or standard, the present invention also applies to other formats or interfaces. MIDI speech encoding system 20 includes a microphone (mic) 22 for receiving a speech signal, and outputting analog speech signal on line 24. MIDI speech encoding system 20 includes an AND converter 25 for digitizing an analog speech signal received on line 24. Encoding system 20 also includes a digital speech-to-MIDI conversion system 28 for converting the digitized speech signal received on line 26 to a MIDI file (i.e., a MIDI compatible signal containing speech information). Conversion system 28 includes a memory 38 for storing a speech dictionary, comprising a digitized pattern and a corresponding phoneme identification (ID) for each of a plurality of phonemes. A speech analyzer 30 is coupled to AND converter 25 and memory 38 and identifies the phonemes of the digitized speech signal received over line 26 based on the stored dictionary. A plurality of prosodic parameter detectors, including a pitch detector 40, a duration detector 42, and an amplitude detector 44, are each coupled to memory 38 via line 46 and speech analyzer 30 via line 32. Prosodic parameter detectors 40, 42 and 44 detect various prosodic parameters of the phonemes received over line 32 from analyzer 30, and output prosodic parameter values indicating the value of each detected parameter. A MIDI speech encoder 56 is coupled to memory 38, detectors 40, 42 and 44, and analyzer 30, and encodes the digitized phonemes received by analyzer 30 into a MIDI compatible speech signal, including an identification of the phonemes and the values of the corresponding prosodic parameters. A MIDI sequencer 60 is coupled to conversion system 28 via line 58. MIDI sequencer 60 is the main MIDI controller of encoding system 20 and permits a user to store, edit and manipulate several tracks of MIDI speech information received over line 58.

An embodiment of the speech dictionary (i.e., phoneme dictionary) stored in memory 38 comprises a digitized pattern (i.e., a phoneme pattern) and a corresponding phoneme ID for each of a plurality of phonemes. It is advantageous, although not required, for the speech dictionary used in the present invention to use phonemes because there are only 40 phonemes in American English, including 24 consonants and 16 vowels, according to the International Phoneme Association. Phonemes are the smallest segments of sound that can be distinguished by their contrast within words. Examples of phonemes include /b/, as in bat, /d/, as in dad, and /k/ as in key or coo. Phonemes are abstract units that form the basis for transcribing a language unambiguously. Although some embodiments of the present invention are explained in terms of phonemes (i.e., phoneme patterns, phoneme dictionaries), other embodiments of the present invention may alternatively be implemented using other types of speech segments (diphones, words, syllables, etc).

The digitized phoneme patterns stored in the phoneme dictionary in memory 38 can be the actual digitized waveforms of the phonemes. Alternatively, each of the stored phoneme patterns in the dictionary may be a simplified or processed representation of the digitized phoneme waveforms, for example, by processing the digitized phoneme to remove any unnecessary information. Each of the phoneme IDs stored in the dictionary is a multi bit quantity (i.e., a byte) that uniquely identifies each phoneme.

The phoneme patterns stored for all 40 phonemes in the dictionary are together known as a voice font. A voice font can be stored in memory 38 by a person saying into microphone 22 a standard sentence that contains all 40 phonemes, digitizing, separating and storing the digitized phonemes as digitized phoneme patterns in memory 38. System 20 then assigns a standard phoneme ID for each phoneme pattern. The dictionary can be created or implemented with a generic or neutral voice font, a generic male voice (lower in pitch, rougher quality etc.), a generic female voice font (higher pitch, smoother quality), or any specific voice font, such as the voice of the person inputting speech to be encoded.

A plurality of voice fonts can be stored in memory 38. Each voice font contains information identifying unique voice qualities (unique pitch or frequency, frequency range, rough, harsh, throaty, smooth, nasal, etc.) that distinguish each particular voice from others. The pitch, duration and amplitude of the received digitized phonemes (patterns) of the voice font can be calculated (for example, using the methods discussed below) and are assigned the average pitch, duration and amplitude for this voice font. In addition, a speech frequency (pitch) range can be estimated for this voice, for example as the speech frequency range of an average person (i.e., 3 KHz), but centered at the average frequency for each phoneme. Range estimates for duration and amplitude can similarly be used.

Also, with seven bits, for example, to represent the value of each prosodic parameter, there are 128 possible quantized values for pitch, duration and amplitude, and for example, can be spaced evenly (linearly) or exponentially across their respective ranges. Each of the average pitch, duration and amplitude values for each voice font are assigned, for example, the middle quantized level, number 64 (for linear spacing) out of 128 total quantized levels. Alternatively, each person may read several sentences into the decoding system 40, and decoding system 40 may estimate a range of each prosodic parameter based on the variation of each prosodic parameter between the sentences.

Therefore, one or more voice fonts can be stored in memory 38 including the phoneme patterns (containing average values for each prosodic parameter). Although not required, to increase speed of the system, MIDI speech encoding system 20 may also calculate and store in memory 38 with the voice font the average prosodic parameter values for each phoneme including average pitch, duration and amplitude, the ranges for each prosodic parameter for this voice, the number of quantization levels, and the spacing between each quantization level for each prosodic parameter.

In order to assist system 20 in accurately encoding the speech signal received on line 26 into the correct values, memory 38 should include the voice font of the person inputting the speech signal for encoding, as discussed below. The voice font which is used by system 20 to assist in encoding the speech signal received on line 26 can be user selectable through a keyboard, pointing device, sequencer 60, or a verbal command input to microphone 22, and is known as the designated input voice font. Also, as discussed in greater detail below regarding FIG. 2, the person inputting the sentence to be encoded into a MIDI compatible signal can also select a designated output voice font to be used to reconstruct and generate the speech signal from the MIDI speech signal.

Speech analyzer 30 receives the digitized speech signal on line 26 and has access to the phoneme dictionary (i.e., phoneme patterns and corresponding phoneme IDs) stored in memory 38. Speech analyzer 30 uses pattern matching or pattern recognition to match the pattern of the received digitized speech signal on line 26 to the plurality of phoneme patterns stored in the designated input voice font in memory 38. In this manner, speech analyzer 30 identifies all of the phonemes in the received speech signal. To identify the phonemes in the received speech signal, speech analyzer 30, for example, may break up the received speech signal into a plurality of speech segments (syllables, words, groups of words, etc.) larger than a phoneme for comparison to the stored phoneme vocabulary to identify all the phonemes in the large speech segment. This process is repeated for each of the large speech segments until all of the phonemes in the received speech signal have been identified.

After identifying each of the phonemes in the speech signal received over line 26, speech analyzer 30 separates the received digitized speech signal into the plurality of digitized phoneme patterns. The pattern for each of the received phonemes can be the digitized waveform of the phoneme, or can be a simplified representation that includes information necessary for subsequent processing of the phoneme, discussed in greater detail below.

Speech analyzer 30 outputs the pattern of each received phoneme on line 32 for further processing, and at the same time, outputs the corresponding phoneme ID on line 34. For 40 phonemes, the phoneme ID may be a 6 bit signal provided in parallel over line 34. Analyzer 30 outputs the phoneme patterns and corresponding phoneme IDs sequentially for all received phonemes (i.e., on a first-in, first-out basis). The phoneme IDs output on line 34 only indicate what was said in the speech signal input on line 26, but does not indicate how the speech was said. Prosodic parameter detectors 40, 42 and 44 are used to identify how the original speech signal was said. Also, the designated input voice font, if it was selected to be the voice font of the person inputting the speech signal, also provides information regarding the qualities of the original speech signal.

Pitch detector 40, duration detector 42 and amplitude detector 44 measure various prosodic parameters for each phoneme. The prosodic parameters (pitch, duration and amplitude) of each phoneme indicate how the speech was said and are important to permit a natural sounding reconstruction or playback of the original speech signal.

Pitch detector 40 receives each phoneme pattern on line 32 from speech analyzer 30 and measures the pitch (fundamental frequency $F_O$) of the phoneme represented by the received phoneme pattern by any one of several conventional time-domain techniques or by any one of the commonly employed frequency-domain techniques, such as autocorrelation, average magnitude difference, cepstrum, spectral compression and harmonic matching methods. These techniques may also be used to identify changes in the fundamental frequency of the phoneme (i.e., a rising or lowering pitch, or a pitch shift). Pitch detector 40 also receives the designated input voice font from memory 38 over line 54. With 7 bits used to indicate phoneme pitch, there are 128 distinct frequencies or quantized levels, which can be, for example, spaced across the frequency range and centered at the average frequency for this phoneme, as indicated by information stored in memory 38 with the designated input voice font. Therefore, there are approximately 64 frequency values above the average, and 64 frequency values below the average frequency for each phoneme. Due to the unique qualities of each voice, different voice fonts can have different average pitches (frequencies) for each phoneme, different frequency ranges, and different spacing between each quantized level in the frequency range.

Pitch detector 40 compares the pitch of the phoneme represented by the received phoneme pattern (received over line 32) to the pitch of the corresponding phoneme in the designated input voice font (which contains the average pitch for this phoneme). Pitch detector 40 outputs a seven bit value on line 48 identifying the relative pitch of the received phoneme as compared to the average pitch for this phoneme (as indicated by the designated input voice font).

Duration detector 42 receives each phoneme pattern on line 32 from speech analyzer 30 and measures the time duration of the received phoneme represented by the received phoneme pattern. Duration detector 42 compares the duration of the received phoneme to the average duration for this phoneme as indicated by the designated input voice font. With, for example, 7 bits used to indicate phoneme duration, there are 128 distinct duration values, which are spaced across a range which is centered, for example, at the average duration for this phoneme, as indicated by the designated input voice font. Therefore, there are approximately 64 duration values above the average, and 64 duration values below the average duration for each phoneme. Duration detector 42 outputs a seven bit value on line 50 identifying the relative duration of the received phoneme as compared to the average phoneme duration indicated by the designated input voice font.

Amplitude detector 44 receives each phoneme pattern on line 32 from speech analyzer 30 and measures the amplitude of the received phoneme pattern. Amplitude detector 44 may, for example, measure the amplitude of the phoneme as the average peak-to-peak amplitude across the digitized phoneme. Other amplitude measurement techniques may be used. Amplitude detector 44 compares the amplitude of the received phoneme to the average amplitude of the phoneme as indicated by the designated input voice font received over line 46. Amplitude detector 44 outputs a seven bit value on line 52 identifying the relative amplitude of the received phoneme as compared to the average amplitude of the phoneme as indicated by the designated input voice font.

MIDI speech encoder 56 generates and outputs a MIDI compatible speech signal based on the phoneme IDs (provided to encoder 56 over line 34) and prosodic parameter values (provided to encoder 56 over lines 48, 50, 52) that permits accurate and natural sounding playback or reconstruction of the analog speech signal input on line 24. Before some of the details of encoder 56 are described, some basic principles relating to the MIDI standard will be explained.

The MIDI standard provides 16 standard pathways, known as channels, for the transmission and reception of MIDI data. MIDI channels are used to designate which MIDI instruments or MIDI devices should respond to which commands. For music generation, each MIDI device (i.e., sound generator, synthesizer) may be configured to respond to MIDI commands provided on a different MIDI channel.

MIDI devices generally communicate by one or more MIDI messages. Each MIDI message includes several bytes. There are two general types of MIDI messages, those messages that relate to specific MIDI channels and those that relate to the system as a whole. The general format of a channel message is as follows:

| | | |
|---|---|---|
| 1sssnnnn | 0xxxxxxx | 0yyyyyyy |
| Status | Data1 | Data2 |

A MIDI message includes three bytes, a status byte and two data bytes. The "sss" bits are used to define the message type and the "nnnn" bits are used to define the channel number. (There is no channel number for a system MIDI message). The "xxxxxxx" and "yyyyyyy" bits carry the message data. The first bit of each byte indicates whether the byte is a status byte or a data byte. As a result, only seven bits can be used to carry data in each data byte of a MIDI message. Because only four bits are provided to identify the channel number, the MIDI protocol allows only 16 channels to be addressed directly. However, a multiport MIDI interface may be used to address many more channels.

Three MIDI channel messages include Note On, Note Off, and Program Change. The Note On message turns on a musical note and the Note Off turns off a musical note. The Note On message takes the general form:

[8nH][Note number][Velocity], and Note Off takes the general form:

[9nH][Note number][Velocity], where n identifies the MIDI channel in Hexadecimal. In music, the first data byte [Note Number] indicates the number of the note. The MIDI range consists of 128 notes (ten and a half octaves from C-2 to G8). In music, the second data byte [Velocity] indicates the speed at which the note was pressed or released. In music, the velocity parameter is used to control the volume or timbre of the output of an instrument.

The Program Change message takes the general form:

[CnH][Program number], where n indicates the channel number.

Program Change messages are channel specific. The Program number indicates the location of a memory area (such as a patch, a program, a performance, a timbre or a preset) that contains all the parameters for one of the functions of a MIDI sound. The Program Change message changes the MIDI sound (i.e., patch) to be used for a specific MIDI channel. For example, when a Program Change message is received, a synthesizer will switch to the corresponding sound.

Although there are several different ways in which MIDI commands and features may be used to encode the phoneme IDs and prosodic parameter values of the received speech signal, only one MIDI encoding technique will be described below.

In an embodiment of the present invention, MIDI speech encoder 56 generates and outputs a signal comprising a plurality of MIDI messages that represents the original speech signal (received on line 26). In an embodiment of the present invention, the MIDI messages representing the speech signal (the MIDI speech signal) are communicated over a single MIDI channel (the MIDI speech channel). Alternatively, the MIDI speech signal can be communicated over a plurality of MIDI channels. Also, each phoneme pattern stored in the dictionary is mapped to a different MIDI Program. The phoneme IDs stored in the dictionary can identify the MIDI Programs corresponding to each phoneme. Also, an embodiment of the present invention uses the Note Number and Velocity parameters in MIDI messages to carry phoneme pitch and amplitude information, respectively, for each phoneme of the speech signal.

The use of the Note Number and Velocity bytes in a MIDI message closely matches the phoneme prosodic parameters of pitch and amplitude, thereby permitting standard MIDI editing devices to edit the various parameters of the MIDI speech signal. However, it is not necessary to match the speech parameters to the MIDI parameters. The data bytes of the MIDI messages can be used to represent many different parameters or commands, so long as the controlled MIDI device (i.e., a MIDI speech synthesizer) understands the format of the received MIDI parameters and commands.

For each phoneme ID received over line 34, MIDI speech encoder 56 generates a Program Change message changing the MIDI Program of the MIDI speech channel to the MIDI Program corresponding to the phoneme ID received on line 34. Next, MIDI speech encoder 56 generates a Note On message to turn on the phoneme identified on line 34. The 7 bit pitch value of the phoneme received over line 48 is inserted into the Note Number byte of the Note On message, and the 7 bit amplitude value of the phoneme received over line 52 is inserted into the Velocity byte. In a similar fashion, encoder 56 generates a Note Off message to turn off the phoneme, inserting the same pitch and amplitude values into the message data bytes. Rather than using a Note Off message, a Note On message designating a Velocity (amplitude) of zero can alternatively be used to turn off the phoneme. Also, in an embodiment of the present invention, encoder 56 generates one or more MIDI Time Code (MTC) messages or MIDI Clock messages to control the duration of each phoneme (i.e., the time duration between the Note On and Note Off messages) based on the duration value of each phoneme received over line 50. Other MIDI timing or coordination features may be alternatively used to control the duration of each phoneme.

In this manner, the speech signal received over line 26 is encoded into a MIDI speech signal and output over line 58. Encoder 56 also uses the MIDI messages to encode a voice font ID for a designated output voice font. The designated output voice font is used by a speech synthesizer during reconstruction or playback of the original speech signal, described in greater detail below in connection with FIG. 2. In the event no voice font ID is encoded in the MIDI speech signal, a speech synthesizer can use a default output voice font.

MIDI sequencer 60, which is not required, may be used to edit the MIDI speech signal output on line 58. The MIDI speech signal output on line 58 or 62 may be transmitted over a transmission medium, such as the Internet, wireless communications, or telephone lines, to another MIDI device. Alternatively the MIDI speech signal output on line 62 may be stored in memory, such as RAM, EPROM, a floppy disk, a hard disk drive (HDD), a tape drive, an optical disk or other storage device for later replay or reconstruction of the original speech signal.

Figure 2:
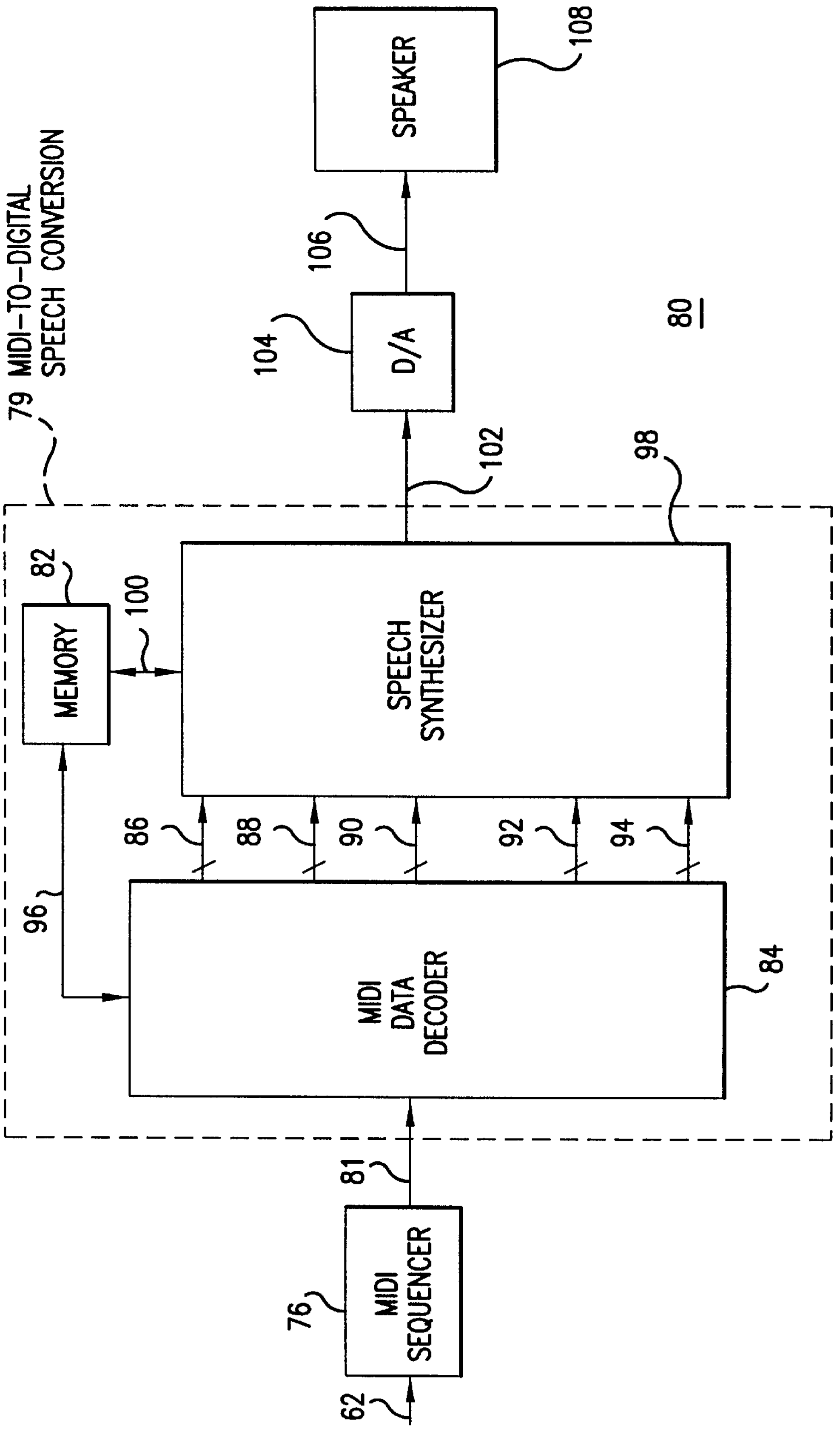
FIG. 2 illustrates a functional block diagram of a MIDI speech decoding system according to a first embodiment of the present invention.

FIG. 2 illustrates a functional block diagram of a MIDI speech decoding system according to a first embodiment of the present invention. MIDI speech decoding system 80 includes a MIDI sequencer 76 for receiving a MIDI speech signal (i.e., a MIDI file that represents a speech signal) over line 62. MIDI sequencer 76 is optional and allows a user to edit the various speech tracks on the received MIDI speech signal. A MIDI-to-digital speech conversion system 79 is coupled to sequencer 76 via line 81 and converts the received MIDI speech signal from MIDI format to a digitized speech signal. Speech conversion system 79 includes a MIDI data decoder 84 for decoding the MIDI speech signal, a memory 82 for storing a phoneme dictionary and one or more voice fonts, and a speech synthesizer 98. In one embodiment, the phonemes of each voice font have prosodic parameter values which are assigned as average values (i.e., a value of 64 out of 128 quantized values) for that voice font. Decoding system 80 implements the dictionary of memory 82 for speech decoding and reconstruction using the phoneme patterns of the designated output voice font. The designated output voice font may or may not be the same as the designated input voice font used for encoding the speech signal. Speech synthesizer 98 is coupled to memory 82 and decoder 84 and generates a digitized speech signal. A D/A converter 104 is coupled to conversion system 79 via line 102 and converts a digitized speech signal to an analog speech signal. A speaker 108 is coupled to converter 104 via line 106 and outputs sounds (i.e., speech signals) based on the received analog speech signal.

Decoder 84 detects the various parameters of the MIDI messages of the MIDI speech signal received over line 81. Decoder 84 detects the one or more MIDI messages identifying a voice font ID to be used as the designated output voice font. Decoder 84 outputs the detected output voice font ID on line 86. Decoder 84 detects each MIDI Program Change message and the designated Program number, and outputs the phoneme ID corresponding to the Program number on line 88. In an embodiment of the present invention, the phoneme ID is the same as the Program number. At the same time that decoder 84 outputs the phoneme ID on line 88, decoder 84 also outputs on lines 90, 92 and 94 the corresponding prosodic parameters (pitch, duration and amplitude) of the phoneme based on, in one embodiment of the invention, the Note On, Note Off and MIDI timing messages (i.e., MIDI Time Code or MIDI Clock messages), and the Note number and Velocity parameters in the MIDI speech signal received over line 81. Alternatively, other MIDI messages and parameters can be used to carry phoneme IDs and prosodic parameters.

The seven bit pitch value carried in the Note number byte of the Note On and Note Off messages corresponding to the phoneme (Program number) is output as a phoneme pitch value onto line 90. The seven bit amplitude value carried in the Velocity byte is output as a phoneme amplitude value onto line 94. Alternatively, if the pitch and amplitude values output on lines 90 and 94 are not 7 bit values, decoder 84 may perform a mathematical conversion. Decoder 84 also calculates the duration of the phoneme based on the MIDI timing messages (i.e., MIDI Time Code or MIDI Clock messages) corresponding to the phoneme (Program Number) received over line 81. Decoder 84 outputs a phoneme duration value over line 92. The process of identifying each phoneme and the corresponding prosodic parameters based on the received MIDI messages, and outputting this information over lines 88–94 is repeated until all the MIDI messages of the received MIDI speech signal have been processed in this manner.

Speech synthesizer 98 receives the phoneme IDs over line 88, corresponding prosodic parameter values over lines 90, 92 and 94, and voice font ID for the received MIDI speech signal over line 86. Synthesizer 98 has access to the voice fonts and corresponding phoneme IDs stored in memory 82 via line 100, and selects the voice font (i.e., phoneme patterns) corresponding to the designated output voice font (identified on line 86) for use as a dictionary for speech synthesis or reconstruction. Synthesizer 98 generates a speech signal by, for example, concatenating phonemes of the designated output voice font in an order in which the phoneme IDs are received over line 88 from decoder 84. This phoneme order is based on the order of the MIDI messages of the received MIDI speech signal (on line 81). The concatenation of output voice font phonemes corresponding to the received phoneme IDs generates a digitized speech signal that accurately reflects what was said (same phonemes) in the original speech signal (on line 26). To generate a natural sounding speech signal that also reflects how the original speech signal was said (i.e., with the same varying pitch, duration, amplitude), however, each of the concatenated phonemes output by synthesizer 98 must first be modified according to each phoneme's prosodic parameter values.

For each phoneme ID received on line 88, synthesizer 98 identifies the corresponding phoneme stored in the designated output voice font (identified on signal 86). Next, synthesizer 98 adjusts or modifies the relative pitch of the corresponding voice font phoneme according to the seven bit pitch value provided on signal 90. Using seven bits for the phoneme pitch value, there are 128 different quantized pitch levels. In an embodiment of the present invention, the pitch level of the voice font phoneme is an average value (value 64 out of 128). Different voice fonts can have different spacings between quantized levels, and different average pitches (frequencies). As an example, if the pitch value on signal 90 is 64, (indicating the average pitch), then no pitch adjustment occurs, even though the exact pitch of the output voice font phoneme having value 64 (indicating average pitch) may be different. If, for example, the pitch value provided on signal 90 is 66, this indicates that the output phoneme should have a pitch value that is two quantized levels higher than the average pitch for the designated output voice font. Therefore, the pitch for this output phoneme would be increased by two quantized levels (to level 66).

In a similar fashion as that described for the phoneme pitch value, the duration and amplitude of the output phonemes (voice font phonemes) are modified based on the values of the duration and amplitude values provided on signals 92 and 94, respectively. As with the adjustment of the output phoneme's pitch, the duration and amplitude of the output phoneme will be increased or decreased by synthesizer 98 in quantized steps as indicated by the values provided on signals 92 and 94. Other techniques may be employed for modifying each output phoneme based on the received prosodic parameter values. After the corresponding voice font phoneme has been modified according to the prosodic parameter values received on signals 90, 92 and 94, the output phoneme is stored in a memory (not shown). This process is repeated for all the phoneme IDs received over line 88 until all output phonemes have been modified according to the received prosodic parameter values. A smoothing algorithm may be performed on the modified output phonemes to smooth together the phonemes.

The modified output phonemes are output from synthesizer 98 on line 102. D/A converter 104 converts the digitized speech signal received on line 102 to an analog speech signal, output on line 106. Analog speech signal on line 106 is input to speaker 108 for output as audio which can be heard.

In order to reconstruct all aspects of the original speech signal (received by system 20 at line 24) at decoding system 80, the designated output voice font used by system 80 during reconstruction should be the same as the designated input voice font used during encoding at system 40. By selecting the output voice font to be the same as the input voice font, the reconstructed speech signal will include the same phonemes (what was said), having the same pitch, duration and amplitude, and also having the same unique voice qualities (harsh, rough, smooth, throaty, nasal, specific voice frequency, etc.) as the original input voice (on line 44).

However, a designated output voice font may be selected that is different from the designated input voice font. In this case, the reconstructed speech signal will have the same phonemes and the pitch, duration and amplitude of the phonemes will vary in a proportional amount or similar manner as in the original speech signal (i.e., similar or proportional varying pitches, intonation, rhythm), but will have unique voice qualities that are different from the input voice.

Figure 3:
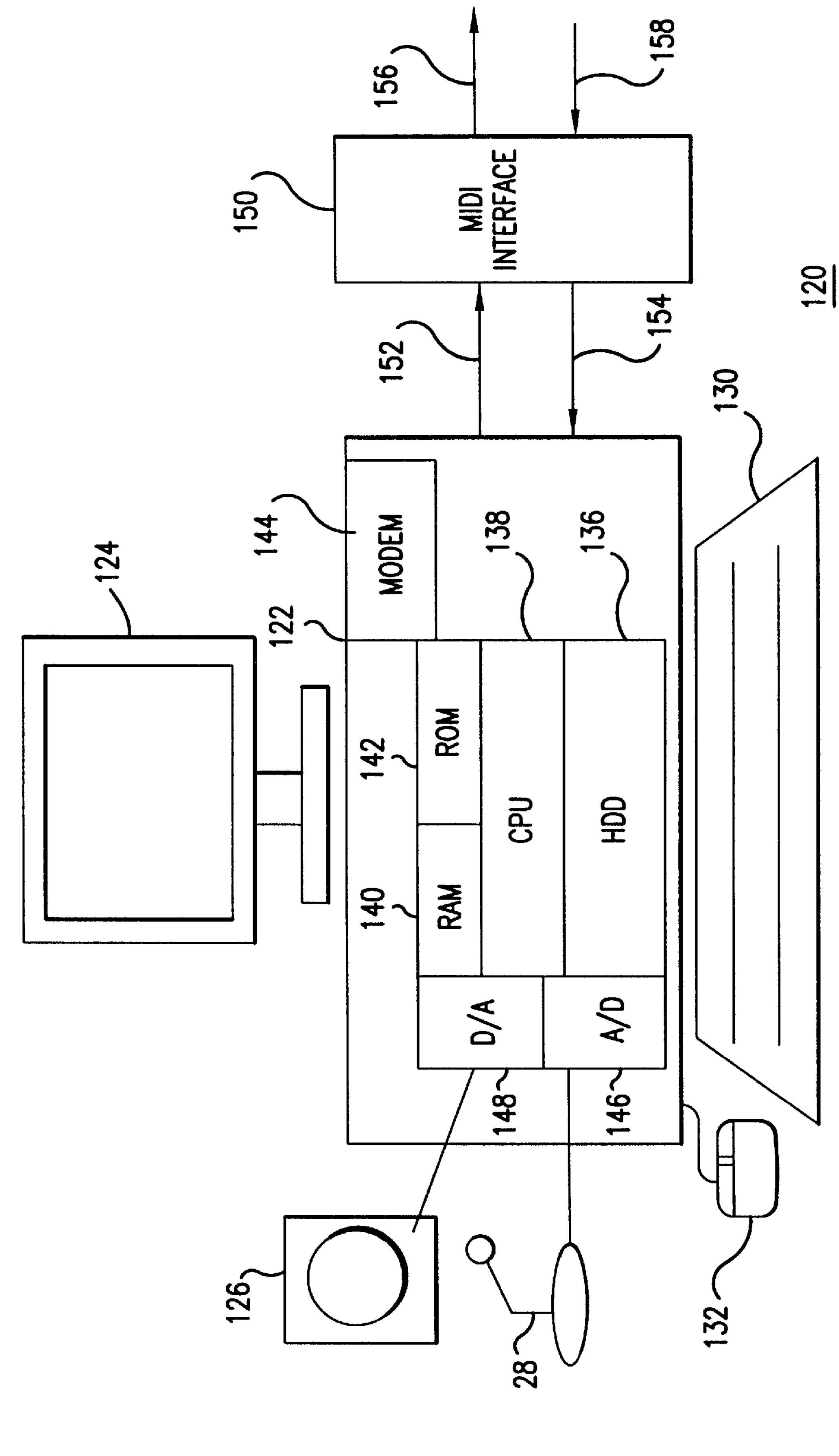
FIG. 3 illustrates a block diagram of an embodiment of a computer system for implementing a MIDI speech encoding system and a MIDI speech decoding system of the present invention.

FIG. 3 illustrates a block diagram of an embodiment of a computer system for advantageously implementing both MIDI speech encoding system 20 and MIDI speech decoding system 80 of the present invention. Computer system 120 includes a computer chassis 122 housing the internal processing and storage components, including a hard disk drive (HDD) 136 for storing software and other information, a CPU 138 coupled to HDD 136, such as a Pentium® processor manufactured by Intel Corporation, for executing software and controlling overall operation of computer system 120. A random access memory (RAM) 140, a read only memory (ROM) 142, an A/D converter 146 and a D/A converter 148 are also coupled to CPU 138. Computer system 120 also includes several additional components coupled to CPU 138, including a monitor 124 for displaying text and graphics, a speaker 126 for outputting audio, a microphone 128 for inputting speech or other audio, a keyboard 130 and a mouse 132. Computer system 120 also includes a modem 144 for communicating with one or more other computers via the Internet, telephone lines or other transmission medium. Modem 144 can be used to send and receive one or more MIDI speech files to a remote computer (or MIDI device). A MIDI interface 150 is coupled to CPU 138 via one or more serial ports.

HDD 136 stores an operating system, such as Windows 95®, manufactured by Microsoft Corporation and one or more application programs. The phoneme dictionaries, fonts and other information (stored in memories 50 and 82) can be stored on HDD 136. Computer system 120 can operate as MIDI speech encoding system 20, MIDI speech decoding system 80, or both. By way of example, the functions of MIDI sequencers 60 and 76, speech analyzer 30, detectors 40, 42 and 44, MIDI speech encoder 56, MIDI data decoder 84 and speech synthesizer 98 can be implemented through dedicated hardware (not shown), through one or more software modules of an application program stored on HDD 136 and written in the C++ or other language and executed by CPU 138, or a combination of software and dedicated hardware.

In order for computer system 120 to operate as a central controller of a MIDI system (such as encoding system 20, or decoding system 80), MIDI interface 150 is typically used to convert incoming MIDI signals (i.e., MIDI speech tracks or signals) on line 158 into PC compatible electrical form and PC compatible bit rate. Interface 150 may not be necessary, depending on the computer. Interface 150 converts incoming MIDI signals to, for example, RS-232 signals. Similarly, interface 150, converts outgoing MIDI signals on line 152 from a PC electrical format (i.e., RS-232) and bit rate to the appropriate MIDI electrical format and bit rate. Interface 150 may be located internal or external to chassis 122, and the portion of interface 150 that converts bit rates may be performed in hardware or software. Lines 156 and 158 can be connected to one or more MIDI devices (i.e., MIDI speech synthesizers), for example, to remotely control the remote synthesizer to generate speech based on a MIDI signal output from computer system 120.

Referring to FIGS. 1 and 2 and by way of example, MIDI speech encoding system 20 and MIDI speech decoding system 80 may be incorporated in an electronic answering machine or voice mail system. An incoming telephone call is answered by the voice mail system. The voice message left by the caller is digitized by AID converter 25. Speech analyzer 30 identifies the phonemes in the voice message, and detectors 40–44 measure the prosodic parameters of each phoneme. MIDI speech encoder 58 encodes the phoneme IDs and prosodic parameters into a MIDI signal, which is stored in memory 38. When a user of the voice mail system accesses this voice mail message for replay, the MIDI speech signal for the voice message is retrieved from memory 38, and MIDI data decoder 84 converts the stored MIDI speech signal from MIDI format into phoneme IDs and prosodic parameters (pitch, duration and amplitude). Speech synthesizer 98 reconstructs the voice message by selecting phonemes from the designated output voice font corresponding to the received phoneme IDs and modifying the voice font phonemes according to the received prosodic parameters. The modified phonemes are output as a speech signal which is heard by the user via speaker 108. If a voice message is extremely long, the user can use well known playback and frequency control features of MIDI sequencer 60 or 76 to fast forward through the message (while listening to the message) without altering the pitch of the message.

Figure 4:
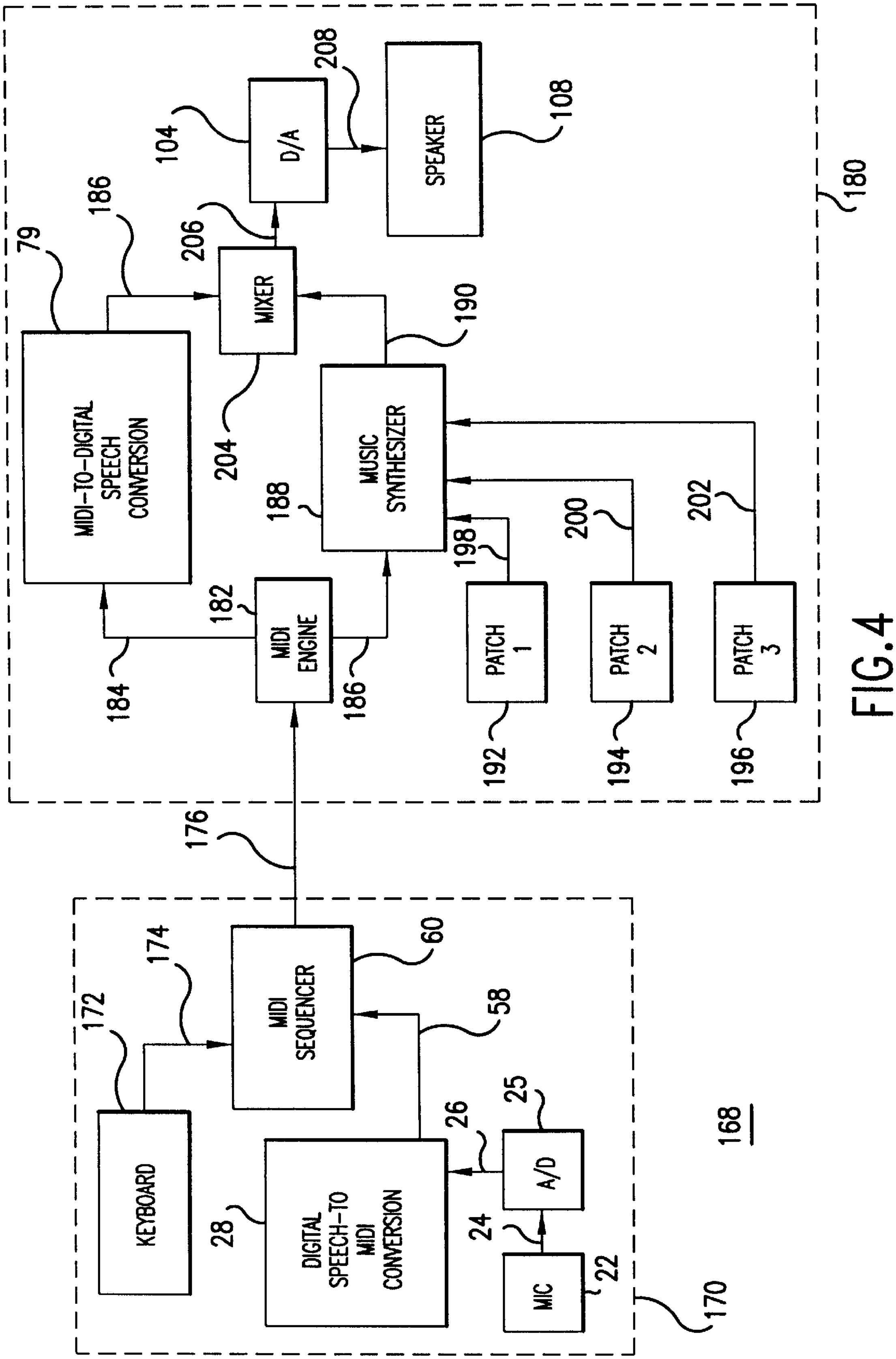
FIG. 4 illustrates a functional block diagram of a MIDI speech system according to a second embodiment of the present invention.

FIG. 4 illustrates a functional block diagram of a MIDI speech system according to a second embodiment of the present invention. MIDI speech system 168 includes a MIDI file generator 170 and a MIDI file playback system 180. MIDI file generator 170 includes a microphone 22 for receiving a speech signal. An A/D converter 25 digitizes the speech signal received over line 24. Digital speech-to-MIDI conversion system 28, previously described above in connection with FIG. 1, is coupled to A/D converter 25 via line 26, and converts a digitized speech signal to a MIDI signal. MIDI sequencer 60 is coupled to conversion system 28 via line 58 and to a keyboard 172 via line 174. Sequencer 60 permits a user to create and edit both speech and music MIDI tracks.

MIDI file playback system 180 includes a MIDI engine 182 for separating MIDI speech tracks from MIDI music tracks. MIDI engine 182 also includes a control panel (not shown) providing MIDI playback control features, such as controls for frequency, volume, tempo, fast forward, reverse, etc. to adjust the parameters of one or more MIDI tracks during playback. MIDI-to-digital speech conversion system 79, previously described above in connection with FIG. 2, is coupled to MIDI engine 182, and converts MIDI speech signals to digitized speech signals. A MIDI music synthesizer 188 is coupled to MIDI engine 182 and generates digitized musical sounds based on MIDI music tracks received over line 186. A plurality of patches 192, 194 and 196 are coupled to music synthesizer 188 via lines 198, 200 and 202 respectively for providing a plurality of different musical instruments or sounds for use by synthesizer 188. A mixer 204 is coupled to conversion system 79 and music synthesizer 188. Mixer 204, which can operate under user control, receives a digitized speech signal over line 186 and a digitized music signal over line 190 and mixes the two signals together to form a single audio output on line 206. The digitized audio signal on line 206 is converted to analog form by D/A converter 104. A speaker 108 is coupled to D/A converter 104 and outputs the received analog audio signal for the user to hear.

Referring to FIG. 4, the operation of MIDI speech system 168 will now be described by way of example. MIDI file generator 170 may be used by a composer to create and edit an audio portion of a slide show, movie, or other presentation. The audio portion of the presentation includes music created by the composer (such as background music) and speech (such as narration). Because the music portion and the speech portion should be coordinated together and may need careful editing of the timing, pitch, volume, tempo, etc., generating and storing the music and speech as MIDI signals (rather than digitized audio) advantageously permits the composer to edit the MIDI tracks using the powerful features of MIDI sequencer 60. In addition, the use of MIDI signals provides a much more efficient representation of the audio information for storage and transmission than digitized audio.

The composer creates the music portion of the presentation using MIDI sequencer 60 and keyboard 172. The music portion includes one or more MIDI tracks of music. The composer creates the speech portion of the audio by speaking the desired words into mic 22. The analog speech signal is digitized by A/D converter 25 and input to conversion system 28. Conversion system 28 converts the digitized speech signal to a MIDI speech signal. The MIDI music signal (stored in sequencer 60) and the MIDI speech signal provided on line 58 are combined by sequencer 60 into a single MIDI audio signal or file, which is output on line 176.

An audio conductor uses MIDI file playback system 180 to control the playback of the audio signal received over line 176. The audio output of speaker 108 may be coordinated with the video portion of a movie, slide show or the like. MIDI engine 182 receives the MIDI audio signal on line 176 and passes the MIDI speech signals on line 184 and passes the MIDI music signals on line 186. Conversion system 79, which includes speech synthesizer 98 (FIG. 2), generates a digitized speech signal based on the received MIDI speech signal. Music synthesizer 188 generates digitized music based on the received MIDI music signal. The digitized speech and music are mixed at mixer 204, and output using speaker 108.

The above describes particular embodiments of the present invention as defined in the claims set forth below. The invention embraces all alternatives, modifications and variations that fall within the letter and spirit of the claims, as well as all equivalents of the claimed subject matter. For example, while each of the prosodic parameters have been represented using seven bits, the parameters may be represented using more or less bits. In such case a conversion between the prosodic parameter values and the MIDI parameters may be required. In addition, there are many different ways in which the phoneme IDs and prosodic parameter values can be encoded into the MIDI format. For example, rather than mapping each phoneme to a separate MIDI program number, each phoneme may be mapped to a separate MIDI channel number. If phonemes are mapped to different MIDI channel numbers, a multiport MIDI interface may be required to address more than 16 channels. Also, while the embodiments of the present invention have been illustrated with reference to the MIDI standard or format, the present invention applies to many different standard digital formats.

What is claimed is:

1. A method of encoding a speech signal into a MIDI compatible format, comprising the steps of:

receiving an analog speech signal, said analog speech signal comprising a plurality of speech segments;

digitizing the analog speech signal;

identifying each of the plurality of speech segments in the received speech signal;

measuring one or more prosodic parameters for each of said identified speech segments; and converting the speech segment identity and corresponding measured prosodic parameters for each of the identified speech segments into a speech signal having a MIDI compatible format.

2. The method of claim 1 wherein:

said step of receiving comprises the step of receiving an analog speech signal, said analog speech signal comprising a plurality of phonemes;

said step of identifying comprises the step of identifying each of the plurality of phonemes in the received speech signal;

said step of measuring comprises the step of measuring one or more prosodic parameters of each of said identified phonemes; and said step of converting comprises the step of converting the phoneme identity and corresponding measured prosodic parameters for each identified phoneme into a MIDI speech signal, said MIDI speech signal comprising a plurality of MIDI messages that represents the analog speech signal.

3. The method of claim 2 and further comprising the step of storing the MIDI speech signal to enable the later playback of said analog speech signal using said stored MIDI speech signal.

4. The method of claim 2 and further comprising the step of communicating the MIDI speech signal over a transmission medium.

5. The method of claim 4 wherein said step of communicating the MIDI speech signal comprises the step of communicating the MIDI speech signal to a remote user via the Internet.

6. The method of claim 4 wherein said step of communicating further comprises the step of communicating a voice font ID identifying a designated output voice font to be used during playback or reconstruction of the analog speech signal using said MIDI speech signal.

7. The method of claim 2 and further comprising the step of:

storing a dictionary comprising a digitized phoneme pattern and an associated phoneme ID for each said phoneme;

said step of identifying comprising the steps of comparing the digitized speech signal to the phoneme patterns stored in the dictionary to identify the phonemes in the digitized speech signal.

8. The method of claim 2 and further comprising the step of:

storing a dictionary comprising a digitized phoneme pattern and an associated MIDI compatible phoneme identifier for each said phoneme;

said step of identifying comprising the steps of comparing the digitized speech signal to the patterns stored in the dictionary to identify the phonemes in the digitized speech signal.

9. The method of claim 8, wherein said step of storing a dictionary comprises storing a dictionary comprising, for each of said phonemes, a digitized phoneme pattern and a MIDI channel number associated with each said phoneme.

10. The method of claim 8, wherein said step of storing a dictionary comprises storing a dictionary comprising, for each of said phonemes, a digitized phoneme pattern and a MIDI program number associated with each said phoneme.

11. The method of claim 7 wherein said step of measuring one or more prosodic parameters for each of said phonemes comprises the steps of:

measuring the pitch for each of said phonemes;

measuring the duration for each of said phonemes; and measuring the amplitude for each of said phonemes.

12. The method of claim 11, wherein said step of converting comprises the steps of:

converting the phoneme ID of each identified phoneme into a MIDI compatible identifier that identifies the phoneme;

converting the measured pitch of each identified phoneme into a MIDI note number;

converting the measured amplitude of each identified phoneme into a MIDI velocity number;

generating one or more MIDI Note On and Note Off messages for each identified phoneme based on the measured duration of the segment.

13. The method of claim 11, wherein said step of converting comprises the steps of:

converting the phoneme ID of each identified phoneme into a MIDI compatible identifier that identifies the phoneme;

converting the measured pitch of each identified phoneme into a MIDI note number;

converting the measured amplitude of each identified phoneme into a MIDI velocity number;

generating, for each said identified phoneme, a MIDI Note On command at a MIDI velocity specified by the corresponding MIDI velocity number to turn on the phoneme, and a MIDI Note On command at a velocity of zero to turn off the phoneme based on the measured duration of the segment.

14. The method of claim 13 wherein said step of converting the phoneme ID comprises the step converting the phoneme ID of each identified segment into a corresponding MIDI channel number.

15. The method of claim 10 wherein said step of measuring one or more prosodic parameters for each of said phonemes comprises the steps of:

measuring the pitch for each of said phonemes;

measuring the duration for each of said phonemes; and measuring the amplitude for each of said phonemes.

16. The method of claim 15, wherein said step of converting comprises the steps of:

identifying the MIDI program associated with each said identified phoneme using said dictionary;

converting the measured pitch of each identified phoneme into a MIDI note number;

converting the measured amplitude of each identified phoneme into a MIDI velocity number;

generating one or more MIDI Note On and Note Off commands for each identified phoneme based on the measured duration of the phoneme.

17. The method of claim 16, further comprising the step of outputting the MIDI speech signal, said MIDI speech signal comprising information identifying, for each of the identified phonemes, the MIDI program associated with the phoneme, the MIDI note number for each identified phoneme, and the MIDI velocity number for each identified phoneme, and one or more MIDI Note On and Note Off messages.

18. The method of claim 1 and further comprising the steps of:

storing a designated input voice font, said input voice font comprising a plurality of digitized segments, each voice font segment having a plurality of corresponding prosodic parameters;

said step of measuring one or more prosodic parameters comprising the steps of:

measuring the prosodic parameters of the received digitized speech segments; and comparing values of the measured prosodic parameters of the received digitized speech segments to values of the prosodic parameters of the segments of the designated input voice font.

19. A method of generating an analog speech signal based on a speech signal in a MIDI compatible format, said method comprising the steps of:

storing a dictionary comprising:

a) a digitized pattern for each of a plurality of speech segments; and b) a corresponding segment ID identifying each of the digitized segment patterns;

receiving a speech signal in a MIDI compatible format;

decoding the received speech signal in the MIDI compatible format;

converting the received speech signal in the MIDI compatible format into a plurality of speech segment IDs and corresponding prosodic parameter values;

selecting speech segment patterns in the dictionary corresponding to the speech segment IDs in the converted received speech signal;

modifying the selected speech segment patterns according to the values of the corresponding prosodic parameters in the converted received speech signal;

outputting the modified segment patterns to generate a digitized speech signal; and converting the outputted digitized speech signal to an analog format.

20. The method of claim 19 wherein, said dictionary comprises:

a) a digitized pattern for each of a plurality of speech segments; and b) a corresponding MIDI program number for each of the speech segment patterns.

21. The method of claim 20 wherein said step of receiving comprises the step of receiving a MIDI speech signal, said MIDI speech signal comprising a plurality of MIDI program numbers identifying a MIDI program for each of a plurality of speech segments, MIDI note numbers, MIDI velocity numbers, and one or more MIDI Note ON and Note Off messages.

22. The method of claim 21 wherein said step of decoding comprises the step of identifying the MIDI program numbers, MIDI note numbers, MIDI velocity numbers, and one or more status bytes in the received MIDI speech signal.

23. The method of claim 22 wherein said step of converting the MIDI speech signal comprises the steps of:

identifying, using said dictionary, the speech segment patterns corresponding to the MIDI program numbers in the received MIDI compatible speech signal;

converting each MIDI note number in the received MIDI speech signal to a corresponding pitch value;

converting each MIDI velocity number in the received MIDI speech signal to a corresponding amplitude value; and determining a duration value for each identified speech segment pattern based on the one or more MIDI Note On and Note Off messages and one or more MIDI timing messages in the received MIDI speech signal.

24. The method of claim 23 wherein said step of selecting speech segment patterns in the dictionary comprises the step of selecting, using said dictionary, the speech segment patterns corresponding to the MIDI program numbers in the received MIDI speech signal.

25. The method of claim 24 wherein said step of modifying comprises the step of:

modifying the pitch, amplitude and duration of each selected speech segment pattern according to the corresponding pitch value, amplitude value and duration value, respectively.

26. A computer-readable medium having stored thereon a plurality of instructions including instructions, when executed by a processor result in:

identifying and analyzing each of a plurality of speech segments in a digitized speech signal;

measuring a plurality of prosodic parameters for each said identified speech segment, said prosodic parameters comprising at least pitch and amplitude;

converting the measured prosodic parameters to corresponding MIDI compatible values relating to prosody, including converting each measured pitch value to a corresponding MIDI note number and converting each measured amplitude value to a corresponding MIDI velocity number; and generating a MIDI speech signal comprising an identification of each identified speech segment and the corresponding MIDI compatible values relating to prosody.

27. A computer-readable medium having stored thereon a plurality of instructions including instructions, when executed by a processor result in:

analyzing a MIDI compatible speech signal, said MIDI compatible speech signal comprising a plurality of speech segment IDs and corresponding MIDI compatible values relating to prosody;

identifying the plurality of speech segment IDs and corresponding MIDI compatible values relating to prosody in the MIDI speech signal;

selecting a digitized speech segment pattern stored in memory corresponding to each of the identified speech segment IDs;

modifying the selected digitized speech segment patterns according to the MIDI compatible values relating to prosody;

outputting the modified speech segment patterns to generate a digitized speech signal.

28. An apparatus for encoding an analog speech signal into a MIDI speech signal comprising:

a memory storing a dictionary comprising a digitized pattern and a corresponding segment ID for each of a plurality of speech segments;

an A/D converter having an input adapted for receiving an analog speech signal and providing a digitized speech signal output;

a speech analyzer coupled to said memory and said A/D converter, said speech analyzer adapted to receive a digitized speech signal and identify each of the segments in the digitized speech signal based on said dictionary, said speech analyzer adapted to output the segment ID for each of said identified speech segments;

one or more prosodic parameter detectors coupled to said memory and said speech analyzer, said detectors adapted to measure values of the prosodic parameters of each received digitized speech segment; and a MIDI speech encoder coupled to said speech analyzer and said prosodic parameter detectors, said MIDI speech encoder adapted to convert a segment ID and the measured values of the corresponding measured prosodic parameters for each of a plurality of speech segments into a MIDI speech signal.

29. An apparatus for generating a speech signal from a MIDI speech signal, said apparatus comprising:

a MIDI data decoder adapted to receive and decode a MIDI speech signal comprising MIDI compatible speech segment IDs and corresponding MIDI compatible values relating to prosody;

a memory adapted to a store a dictionary, said dictionary comprising a plurality of speech segment patterns and speech segment IDs for a plurality of speech segments;

a speech synthesizer coupled to the MIDI data decoder and the memory, said speech synthesizer selecting a digitized speech segment pattern stored in the dictionary corresponding to each of the speech segment IDs on the received MIDI compatible speech signal, modifying the selected digitized speech segment patterns according to the MIDI compatible values relating to prosody, and outputting the modified speech segment patterns to generate a digitized speech signal.

30. A computer for encoding a speech signal into a MIDI signal comprising:

a CPU;

an audio input device adapted to receive an analog speech signal and having an output;

an A/D converter having an input coupled to the output of said audio input device and providing a digitized speech signal output, said converter output coupled to said CPU;

a memory coupled to said CPU, said memory storing a dictionary comprising a digitized speech segment pattern and a corresponding segment ID for each of a plurality of speech segments; and said CPU being adapted to:

identify, using said dictionary, each of a plurality of speech segments in a received digitized speech signal;

measure one or more prosodic parameters for each of the identified segments; and encode the speech segment ID of each identified speech segment and the corresponding measured prosodic parameters into a MIDI signal.

* * * * *

UNITED STATES PATENT AND TRADEMARK OFFICE

CERTIFICATE OF CORRECTION

PATENT NO. : 5,915,237
DATED : June 22, 1999
INVENTOR(S) : Boss et al.

It is certified that error appears in the above-identified patent and that said Letters Patent is hereby corrected as shown below:

Column 1,
Line 7, "08/764,961" should be -- 2207/4032 --
Line 11, "08/764,962" should be -- 2207/4069 --

Column 3,
Line 64, "AND" should be -- A/D --

Column 4,
Line 6, "AND" should be -- A/D --

Column 6,
Line 15, "does" should be -- do --

Column 12,
Line 53, "AID" should be -- A/D --

Column 18,
Lines 12-13 "instructions, when executed by a processor" should be -- instructions, which, when executed by a processor, --

Signed and Sealed this

Fifth Day of March, 2002

*Attest:*

JAMES E. ROGAN

*Attesting Officer*

*Director of the United States Patent and Trademark Office*